United States Patent [19]

Rolchigo et al.

[11] Patent Number: 5,820,690
[45] Date of Patent: Oct. 13, 1998

[54] CLEANING PROCESSES USING CLEANERS EXHIBITING CLOUD POINT BEHAVIOR

[75] Inventors: Philip M. Rolchigo, Warren; Guanghua Yu, Rockaway, both of N.J.

[73] Assignee: Membrex, Inc., Fairfield, N.J.

[21] Appl. No.: 488,251

[22] Filed: Jun. 7, 1995

[51] Int. Cl.⁶ ................................. B08B 3/04; B08B 7/04
[52] U.S. Cl. ................................ 134/10; 134/30; 134/35; 134/40; 210/651
[58] Field of Search ................................ 134/10, 17, 19, 134/30, 35, 40; 210/651, 774, 195.2

[56] References Cited

U.S. PATENT DOCUMENTS

| | | | |
|---|---|---|---|
| 3,802,917 | 4/1974 | Treat et al. | 134/10 |
| 4,609,488 | 9/1986 | Geke et al. | 252/344 |
| 4,874,523 | 10/1989 | LaFreniere | 210/651 |
| 5,047,083 | 9/1991 | Blake et al. | 75/711 |
| 5,084,183 | 1/1992 | LaFreniere et al. | 210/651 |
| 5,125,966 | 6/1992 | Siefert | 75/711 |
| 5,205,937 | 4/1993 | Bhave et al. | 210/651 |
| 5,207,917 | 5/1993 | Weaver | 210/651 |
| 5,350,457 | 9/1994 | Kitazawa et al. | 134/10 |
| 5,372,723 | 12/1994 | De Geus et al. | 210/639 |
| 5,456,843 | 10/1995 | Koenhen | 210/651 |
| 5,500,125 | 3/1996 | Wallisch et al. | 210/651 |
| 5,529,702 | 6/1996 | Segrave et al. | 134/10 |

OTHER PUBLICATIONS

J.K. Liou, "The Technical And Economical Feasibility Of Ultrafiltration With CARBOSEP For The Regeneration Of Degreasing Baths," 8 pages (ca. 1990).

E. Park et al., "Vibratory Solution Recycling: A Case Study In Pollution Prevention," 4 pages (ca. 1991).

H.J. Weltman et al., "Replacement Of Halogenated Solvent Degreasing With Regenerable Aqueous Cleaners," *Proceedings Of The 46th Annual Purdue Industrial Waste Conference* (May 15, 1991).

T.C. Lindsey et al., "Recovery Of An Aqueous Iron Phosphating/Degreasing Bath By Ultrafiltration," *Air & Waste*, vol. 44, pp. 697–701 (May 1994).

D. Wright, "Minimizing Waste From A Spray Washer," *Finishers' Management*, pp. 22–32 (Oct. 1993).

H. Schwering et al., "Crossflow Microfiltration For Extending The Service Life Of Aqueous Alkali Degreasing Solutions," *Plating And Surface Finishing* (Apr. 1993).

Prosys Corporation, "Microfiltration With Periodic Backpulse," Technical Bulletin Issue No. 91–02A (1992).

Prosys Corporation, "General Membrane Filtration," Technical Bulletin Issue No. 91–04 (1992).

*Primary Examiner*—Robert J. Warden
*Assistant Examiner*—Saeed Chaudhry
*Attorney, Agent, or Firm*—Bryan Cave LLP

[57] ABSTRACT

A cleaning process to remove soil using cleaners exhibiting cloud point behavior (i.e., have a cloud point) and/or in which the cleaner can be recycled is disclosed. The cleaning mixture can be an aqueous cleaning mixture. The temperature can be adjusted so that the cleaning mixture is contacted with the object to be cleaned at a temperature at or above the cloud point temperature, and the temperature and/or composition of spent cleaning mixture can be adjusted so that it is processed to form a soil-enriched stream and a soil-depleted stream while it is below its cloud point temperature. Processing to form the soil-enriched and soil-depleted streams can involve adjusting the system so that at steady state $$\frac{C_{Washer}}{C_{Washer\ Target}} \text{ approaches } 1,$$

where $C_{Washer}$ is the concentration of cleaner in the spent cleaning mixture and $C_{Washer\ Target}$ is the desired concentration of cleaner in the cleaning mixture prior to contacting the object to be cleaned. Desirably a hyperhydrophilic membrane is used in a filtration process to form the soil-enriched and soil-depleted streams from the spent cleaning solution.

30 Claims, 7 Drawing Sheets

OTHER PUBLICATIONS

Prosys Corporation, "Aqueous Cleaning: The PROSYS Aqueous Cleaning Recycle System," 4 pages (ca. 1993).

United States Filter Corporation, "MEMBRALOX Ceramic Filters For Metal Cleaner Recovery And Reuse," 5 pages (ca. 1993).

MICRODYN Technologies, Inc., Recovery Of Toxic Waste From Process Water, 1 page (ca. 1993).

ECO Resources, Inc., "Cleaner Recycling System," Technical Bulletin ECO–MFO 3 (ca. 1993).

Membrex, Inc., "Application Focus: Aqueous Cleaner Recycling By Ultrafiltration," 4 pages (1994).

Membrex, Inc., "Alkaline Cleaner Recycle Handbook," 20 pages (ca. Aug. 1994).

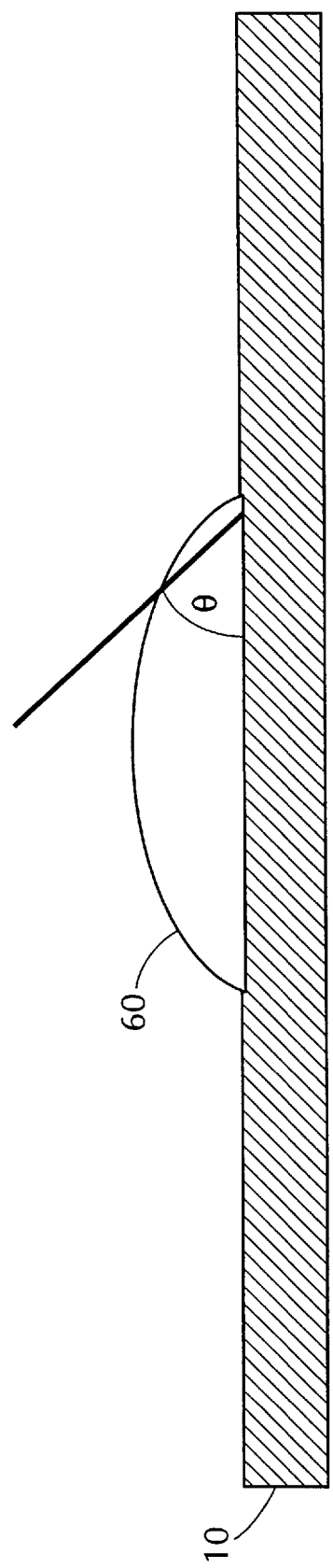

CLEANING PROCESSES USING CLEANERS EXHIBITING CLOUD POINT BEHAVIOR

BACKGROUND OF THE INVENTION

This invention concerns the use of cleaners and particularly aqueous cleaners. More specifically, in one aspect this invention concerns the use of certain cleaners exhibiting the desired cloud point behavior (i.e., have a cloud point that occurs as the temperature rises) and in another aspect concerns the recycling of cleaners regardless of whether they exhibit cloud point behavior. Preferably, the cleaners are aqueous cleaners.

The use of aqueous cleaning processes (alkaline and acidic) for parts cleaning and degreasing is increasing as ozone-depleting solvents (e.g., trichloroethylene, methylene chloride) are being legislated out of use (phase out date of 1995). Using aqueous cleaners is considered safer and environmentally more acceptable than solvent degreasing. Also, aqueous cleaning agents are reported to produce cleaner surfaces than those resulting from solvent degreasing because solvent cleaning often leaves residual soils.

Aqueous cleaners, however, are not free from drawbacks. Unlike vapor degreasing methods, which recycle the active solvents, aqueous cleaners have rarely been recycled. The aqueous cleaning process typically is a batch operation, ending when the cleaning solution capacity has been exhausted by accumulated oils and other soils. That results in both high cleaner replacement cost and a cost for oily waste disposal. The disposal problem also occurs with biodegradable cleaners, because once they are contaminated with waste oils and dissolved metals they cannot be discharged to a drain.

Alkaline cleaning is the dominant aqueous cleaning method for primary soils removal. Alkaline cleaners are effective for removing unpigmented oils, greases, and cutting or grinding fluids from the objects to be cleaned in both immersion and spray washer cleaning systems. Alkaline cleaners are moderately effective for removing soils containing pigmented drawing compounds such as zinc oxide, flour, graphite, and stearates. Alkaline cleaners employ both physical and chemical cleaning mechanisms. Whether a cleaner is alkaline or acidic, a cleaner's physical action reduces the surface tension of the soils, thereby emulsifying and lifting them away from the object. An alkaline cleaner's chemical action (i.e., via its hydroxide groups) saponifies or hydrolyzes certain soils (e.g., lard) to produce soaps.

In general, an alkaline cleaner is composed of a mixture of three major components: (1) builders, (2) organic or inorganic additives, and (3) surfactants. The most common builders include sodium metasilicate, sodium hydroxide, sodium bicarbonate, and different forms of sodium phosphate. Hydroxides and bicarbonates are inexpensive forms of alkalinity. The silicates act to disperse soil and protect certain metals (e.g., aluminum) from attack by alkali salts Additives soften the water (the solvent or carrier) by binding metal ions. Additives include chelating agents such as sodium gluconate, sodium citrate, and tetrasodium ethylenediamine tetraacetate (EDTA). Typically, anionic and non-ionic surfactants are used in formulations for immersion cleaning baths, In formulations for spray cleaners, nonionic surfactants are used almost exclusively because of their low-foaming characteristics.

Acid cleaning is used less often than alkaline cleaning for degreasing metal parts, because acid cleaners capable of removing heavy oil and grease deposits are expensive. Acid cleaning typically is used in combination with alkaline cleaning to pre-treat parts before finishing and is effective at removing oxides and rust from metal surfaces without the application of heat. In some cases, acid cleaning has been found to be even more effective than alkaline cleaning for removing soils contaminated with pigmented drawing compounds. As with alkaline cleaners, the mechanisms involved in acid cleaning are both chemical and physical, depending upon the composition of the cleaner. The chemical action of the acid cleaner reduces oxide films and rust.

Simple acid cleaners can be composed of mineral acids (e.g., hydrochloric and sulfuric), organic acids (e.g., citric, acetic, gluconic, and oxalic), and other acid salts (e.g., sodium phosphates). More complex forms of acid cleaners contain surfactants (e.g., polyether alcohols), inhibitors (e.g., thiourea, wheat flour), and solvents (e.g., glycol ethers).

To illustrate the economic advantage of recycling if it could be successfully accomplished, assume that a given washer is operated at a detergent concentration of 5%v/v (volume/volume), disposed of semiweekly, and operated 48 weeks per year. Assuming a typical cleaner cost of $10 per gallon of concentrate and a waste disposal cost of $1 per gallon of waste, the yearly operating cost for this washer is $36 per gallon of washer sump capacity per year. For a 300 gallon washer, the net operational expenses exceed $10,000, excluding the costs of capital and labor required to operate and maintain the system. By recycling this cleaner, the annual operating costs could be reduced to less than $1,000 while improving overall cleaning quality and consistency. Similarly, the annual savings generated by recycling 500- and 5,000-gallon washers would exceed $16,000 and $160,000, respectively.

J. K. Liou, "The Technical And Economical Feasibility Of Ultrafiltration With CARBOSEP For The Regeneration Of Degreasing Baths," 8 pages (ca. 1990); E. Park et al., "Vibratory Solution Recycling: A Case Study In Pollution Prevention," 4 pages (ca. 1991); H. J. Weltman et al., "Replacement Of Halogenated Solvent Degreasing With Regenerable Aqueous Cleaners," *Proceedings of the 46th Annual Purdue Industrial Waste Conference* (May 15, 1991); T. C. Lindsey et al., "Recovery Of An Aqueous Iron Phosphating/Degreasing Bath By Ultrafiltration," *Air & Waste*, volume 44, pages 697–701 (May 1994); D. Wright, "Minimizing Waste From A Spray Washer," *Finishers' Management*, pages 22–32 (October 1993); H. Schwering et al., "Crossflow Microfiltration For Extending The Service Life Of Aqueous Alkali Degreasing Solutions," *Plating And Surface Finishing* (April 1993); Prosys Corporation, "Microfiltration With Periodic Backpulse," Technical Bulletin Issue No. 91-02A (1992); Prosys Corporation, "General Membrane Filtration," Technical Bulletin Issue No. 91-04 (1992); Prosys Corporation, "Aqueous Cleaning: The PROSYS Aqueous Cleaning Recycle system," 4 pages (ca. 1993); United States Filter Corporation, "MEMBRALOX Ceramic Filters For Metal Cleaner Recovery And Reuse," 5 pages (ca. 1993); MICRODYN Technologies, Inc., "Recovery Of Toxic Waste From Process Water," 1 page (ca. 1993); ECO Resources, Inc., "Cleaner Recycling System," Technical Bulletin ECO-MFO 3 (ca. 1993); Membrex, Inc., "Application Focus: Aqueous Cleaner Recycling By Ultrafiltration," 4 pages (1994); and U.S. Pat. Nos. 5,205,937; 5,207,917; and 5,350,457, concern the use and/or recycle of cleaners, including aqueous cleaners. (Each and every document discussed, referenced, or otherwise mentioned herein, whether or not prior art, is hereby incorporated herein in its entirety for all purposes.)

Membrex, Inc., "Alkaline Cleaner Recycle Handbook," 20 pages (ca. August 1994), was published by Membrex, Inc., the assignee of this application, and is also relevant but is not statutory art.

U.S. Pat. Nos. 4,790,942; 4,867,878; 4,876,013; 4,906,379; 4,911,847; 5,000,848; 5,143,630; and 5,254,250, all owned by Membrex, Inc., concern filtration equipment, membranes (e.g., Membrex, Inc.'s UltraFilic® membranes), and/or methods, which may be useful with the present invention.

A major difficulty in developing a satisfactory cleaner recycling method that is widely applicable arises in part from the numerous cleaners used, which differ in composition and chemical and physical properties. One approach to developing improved methods for recycling cleaners is to formulate cleaners that pass freely through a separatory membrane and form oil-surfactant (soil-cleaner) micelles large enough to be retained by the membrane. However, the overwhelming majority of cleaners on the market today are not easily recycled. Many cleaners are formulated to form surfactant micelles of nearly the same size as the surfactant-oil micelles. The similarity in size between the surfactant micelles and the surfactant-oil micelles makes recycling by a filter nearly impossible. In other cases, such surfactant micelles and surfactant-oil micelles can be size differentiated by microfilters with pore sizes ranging from 0.2 to 1 micron.

Use of such filters, however, has many disadvantages. Microfilters are known to foul because of entrapment of solids and other colloidal materials deep within the filter matrix. Expensive and non-reliable methods such as back-pulsing permeate back through the membrane into the feed stream are used to combat such fouling mechanisms. Additionally, microfilters have pore sizes large enough to allow oils to pass through the membrane back into the washer.

Clearly, a need exists for filtration processes capable of effectively recycling cleaners and particularly aqueous cleaners. Despite the known aqueous cleaner recycling methods, there is still a need for methods to recycle aqueous cleaners that accommodate different cleaners, that recycle with high efficiency, that are easy to operate, and that are cost effective.

SUMMARY OF THE INVENTION

A method satisfying that need and having additional advantages that will be apparent to those skilled in the art has now been developed. Those additional advantages include cost savings through waste minimization; lower operating costs through a reduced rate of net cleaner usage; higher quality cleaning (which reduces the need to rework parts and thus the cost); and better cleaning, which makes possible higher quality subsequent surface treatment (e.g., electroplating and painting).

Broadly speaking, in one aspect the method of this invention is a process for cleaning objects that are contaminated with soil utilizing a cleaning mixture containing a cleaner, the cleaning mixture having a cloud point that occurs as the temperature rises, the process comprising the steps: (a) contacting the object to be cleaned with the cleaning mixture at a temperature at or above the cloud point temperature to remove soil from the object and suspend at least some of the removed soil in the cleaning mixture, thereby forming spent cleaning mixture; (b) adjusting the temperature of spent cleaning mixture or adjusting the composition of spent cleaning mixture or both so that the temperature of the resulting spent cleaning mixture is below its cloud point temperature; and (c) processing resulting spent cleaning mixture while its temperature is below its cloud point temperature to form a soil-depleted stream and a soil-enriched stream.

In another aspect, the method of this invention is a process for cleaning objects that are contaminated with soil utilizing an aqueous cleaning mixture containing a cleaner, the cleaning mixture having a cloud point that occurs as the temperature rises, the process comprising the steps: (a) contacting the object to be cleaned with the aqueous cleaning mixture at a temperature at or above the cloud point temperature to remove soil from the object and suspend at least some of the removed soil in the cleaning mixture, thereby forming spent cleaning mixture; (b) adjusting the temperature of spent cleaning mixture so that the temperature of the cooled spent cleaning mixture is below its cloud point temperature; and (c) processing cooled spent cleaning mixture while its temperature is below its cloud point temperature to form a soil-depleted stream and a soil-enriched stream.

In still another aspect, the method of this invention is a process for cleaning objects that are contaminated with soil utilizing a cleaning mixture containing a cleaner, the process comprising the steps (a) contacting the object to be cleaned with a cleaning mixture containing a cleaner in which the desired cleaner concentration is $C_{Washer\ Target}$ to remove soil from the object and suspend at least some of the removed soil in the cleaning mixture, thereby forming spent cleaning mixture in which the cleaner concentration is $C_{Washer}$, and (b) processing the spent cleaning mixture to form a soil-depleted stream and a soil-enriched stream, the concentration of cleaner in the feed stream processed to form the soil-depleted and soil-enriched streams being $C_{Working\ Tank}$, the processing step including adjusting the system so that at steady state $$\frac{C_{Washer}}{C_{Washer\ Target}} \text{ approaches 1.}$$

In preferred embodiments, the cleaning mixture is an aqueous cleaning mixture and the cleaning mixture displays the desired cloud point behavior (whether or not it is an aqueous cleaning mixture). In other preferred embodiments, the cleaning mixture is an aqueous cleaning mixture that displays the desired cloud point behavior (exhibition of a cloud point as the temperature rises) and the system is adjusted by adjusting cleaner concentration so that at steady state $$\frac{C_{Washer}}{C_{Washer\ Target}} \text{ approaches 1.}$$

In other preferred embodiments the cleaner concentration that is adjusted is $C_{Working\ Tank}$ and it is adjusted to be approximately equal to $C_{Washer\ Target}$ divided by transmission coefficient γ. In other preferred embodiments, forming soil-depleted and soil-enriched streams from the spent cleaning mixture is accomplished using one or more filtration steps employing a membrane that has the appropriate pore sizes, pore size distributions, and surface chemistry for the substances present in the cleaning system (i.e., the one or more cleaners, the carrier, the other substances in the cleaning mixture, the soil, etc.).

The cleaning methods of this invention provide numerous advantages, which will be apparent to those skilled in the art.

BRIEF DESCRIPTION OF THE DRAWINGS

To facilitate further description of the invention, the following drawings are provided in which:

FIG. 7 illustrates the meaning of water-membrane contact angle theta.

Figure 1:
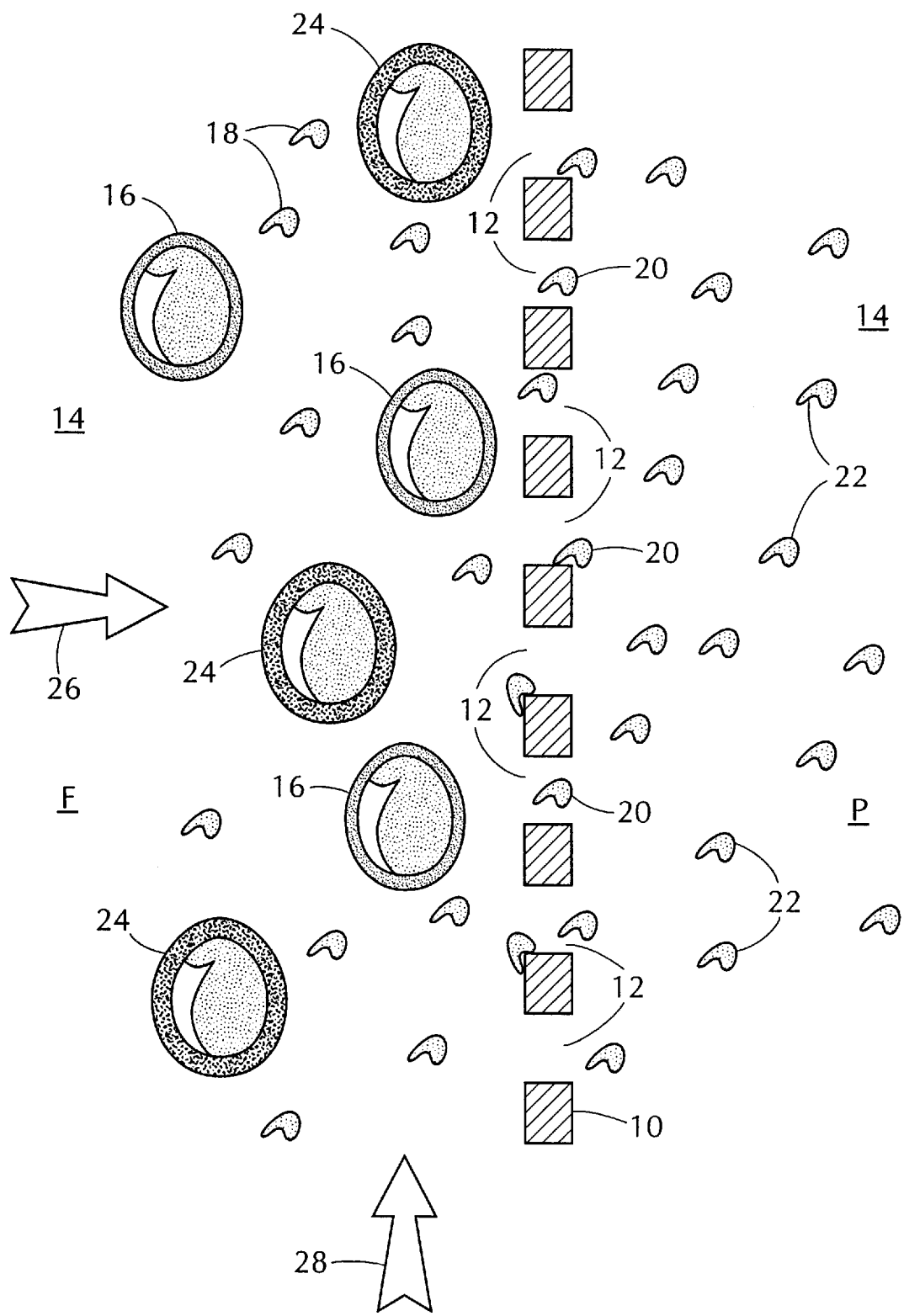
FIG. 1 depicts a key step of the present method, namely, the separation of cleaner through a membrane so that the cleaner can be recycled.

These drawings are provided for illustrative purposes only and should not be used to unduly limit the scope of the invention.

DETAILED DESCRIPTION OF THE INVENTION

It has now been discovered that for cleaning mixtures displaying certain cloud point behavior, controlling the temperatures makes possible a cleaning process using recycling with the benefits noted herein. It has also been discovered that regardless of whether a cleaning mixture displays cloud point behavior, the cleaner concentrations and/or other parameters can be controlled to make possible a cleaning process using recycling with the benefits noted herein. Finally, it has also been discovered that use of membranes having the appropriate pore sizes, pore size distributions, and surface chemistries for the substances present in the cleaning system makes possible a cleaning process using recycling with the benefits noted herein.

Before further discussing the benefits of controlling temperature, cloud point behavior will first be explained. Depending on the particular carrier (e.g., water, organics), on the one or more cleaners, additives, and other substances present, a cleaning mixture may exhibit cloud point behavior. Without wishing to be bound by any theory, for many cleaners it appears that the cloud point is the temperature at or above which aggregates of cleaner (and possibly other substances present in the mixture) form. Those aggregates may scatter visible light, thereby making the mixture seem cloudy. For cleaning mixtures displaying this behavior, if the temperature is below the cloud point temperature, the "cloudiness" does not occur. In other words, it is believed that below the cloud point temperature, the aggregates causing the cloudiness do not form to any noticeable degree. As used herein, the term "cleaning mixture having a cloud point that occurs as the temperature rises" is used to refer to cleaning mixtures that have a temperature at or above which the cloudiness occurs and persists.

For some cleaners, as the temperature rises, the tendency to form aggregates is reduced so that at or above a certain temperature, aggregates tend not to form in any appreciable quantity and cloudiness is not observed whereas below that temperature the cloudiness is observed. For yet other cleaners, the aggregates do not form and the cloudiness is not observed at any normal processing temperature.

One practical effect of the presence of aggregates is that, broadly speaking, the more and the larger the aggregates, the lower the cleaning efficacy for a given overall bulk cleaner concentration. Without wishing to be bound by any theory, the decrease in cleaning efficacy may arise from what may be thought of as a decrease in the effective local concentration and/or effective surface area of cleaner at the molecular level because the individual cleaner molecules have "clumped together" into fewer and larger aggregates. If substantially all of the cleaner forms large aggregates, there may be an "oiling out" of the cleaner, that is, the cleaner may substantially only self-aggregate and form a separate layer.

Another practical effect of the formation of aggregates is that, depending on the size of the aggregates, the use of a membrane and its pore sizes, pore size distribution, and chemistry, and on other factors, the membrane may not allow any significant portion of the aggregates to pass through it.

Broadly speaking, the soils to be removed from an object by the cleaning process will tend to be more fluid at higher temperatures. Thus, in general, higher temperatures are preferred for cleaning. However, if a cleaning mixture having a cloud point that occurs as the temperature rises is used at too high a temperature, cleaner efficacy may be severely reduced and oiling out of the cleaner may possibly occur. Accordingly, it is desired to use as high a temperature as possible without forming so many aggregates that cleaning efficacy is impaired too much.

Whether a particular cleaning mixture to be used has a cloud point may be readily determined merely by adjusting the temperature of the mixture and observing whether cloudiness occurs or disappears. Furthermore, the transmission coefficient for various cleaning mixtures below and above the cloud point temperature may also be readily determined.

For example, the cloud point temperature was determined for each of the following commercially available cleaning mixtures listed in TABLE 1 (below) and then the transmission of cleaner through a membrane was determined at a temperature below the cloud point temperature and at a temperature at or not more than 5 Fahrenheit degrees (5° F.) above the cloud point temperature, as set forth in TABLE 1. The membrane used was Membrex, Inc.'s UltraFilic® MX-500 membrane, a membrane having a 500,000-dalton molecular weight cutoff. The membrane was mounted in a Membrex, Inc. BENCHMARK® rotary filtration device, cleaning mixture was placed in the annular feed region under 10–15 psig pressure, and the device was normally operated (by rotating the inner cylinder) for about 2 hours. At the end of the prescribed period, the concentration of cleaner in the permeate was determined and the percentage transmission determined.

Transmission coefficient $\gamma$ will be defined as the fraction of cleaner presented to the upstream or feed side of the membrane or filter ("membrane" and "filter" are used synonymously herein) that passes through the membrane to the downstream or permeate side of the membrane. In other words, $\gamma$ is the concentration of cleaner in the permeate divided by the concentration of cleaner in the feed, or $$\gamma = \frac{C_{Permeate}}{C_{Food}}. \qquad \text{(Eqn. 1)}$$

TABLE 1

CLEANER TRANSMISSION ABOVE AND BELOW CLOUD POINT TEMPERATURE

| CLEANER | TRANSMISSION BELOW CLOUD POINT TEMPERATURE | TRANSMISSION ABOVE CLOUD POINT TEMPERATURE |
| --- | --- | --- |
| Genspray 202 | 99% | 83% |
| Mountaineer 502-LB | 90% | 65% |
| Oak Kleen 309 | 97% | 76% |
| Alkalume Cleaner 143 | 98% | 67% |
| TM-943 (Vermont America) | 99% | 79% |
| Parker Amchem TD-1208-LP | 92% | 64% |
| Parker Amchem TD-1208-OX | 99% | 60% |
| Parker Amchem TD-1383-BK | 52% | 7% |
| Parker Amchem TD-1414-FI | 93% | 51% |
| Parker Amchem TD-1308-TT | 82% | 60% |
| Betz Kleen 4000 | 99% | 57% |
| Betz Kleen 4005 | 96% | 67% |
| Betz Kleen 4010 | 96% | 80% |
| Oakite Inpro-Clean 3800 | 99% | 87% |
| Oakite Inpro-Clean 2500 | 99% | 89% |
| Oakite Inpro-Clean 1300 | 99% | 59% |

In FIG. 1 membrane 10 separates upstream or feed side F from downstream or permeate side P. Membrane 10 has pores 12. Water (carrier) 14 is present on both sides of the membrane. Particles of soil 16 (in this case oil) are present on feed side F of membrane 10. As used herein, the term "soil" means any type of soil, including oil. Free cleaner (detergent) particles 18 are also present on feed side F of the membrane as are soil-cleaner particles 24 (soil particles coated/emulsified with cleaner). This cleaner is one that tends to self-aggregate (i.e., cloud) as the temperature rises. Arrow 26 indicates the pressure commonly applied to the fluid on the feed side of the membrane, and arrow 28 indicates the fluid flow on the feed side of the membrane. That flow (e.g., a recirculation flow) may be adjusted to be high enough to help keep the feed side of the membrane clean (or at least discourage any significant formation of a stagnant or boundary layer). If high shear devices (as opposed to conventional filters) are used, e.g., Membrex, Inc.'s rotary cylinder and rotary disc devices, a high recirculation flowrate will generally not be needed (because the high shear provides enough cleaning action). Because of the combination of cleaner particle size, membrane pore size, and membrane chemistry, free cleaner particles 18 can pass through pores 12 from feed side F (cleaner particles 20 are in the process of passing through pores 12) to become free cleaner particles 22 on the permeate side P of membrane 10. Self-aggregates of particles of cleaner 18 are not shown because the temperature is below the cloud point temperature. Particles 16 of soil and particles 24 of soil coated/emulsified with cleaner are too large to pass through pores 12. Water molecules, which are not individually depicted, are small enough to pass through pores 12. Simply put, the membrane acts as a barrier to the free-floating and emulsified oil phases but passes the free detergents (cleaners) and water.

Figure 2:
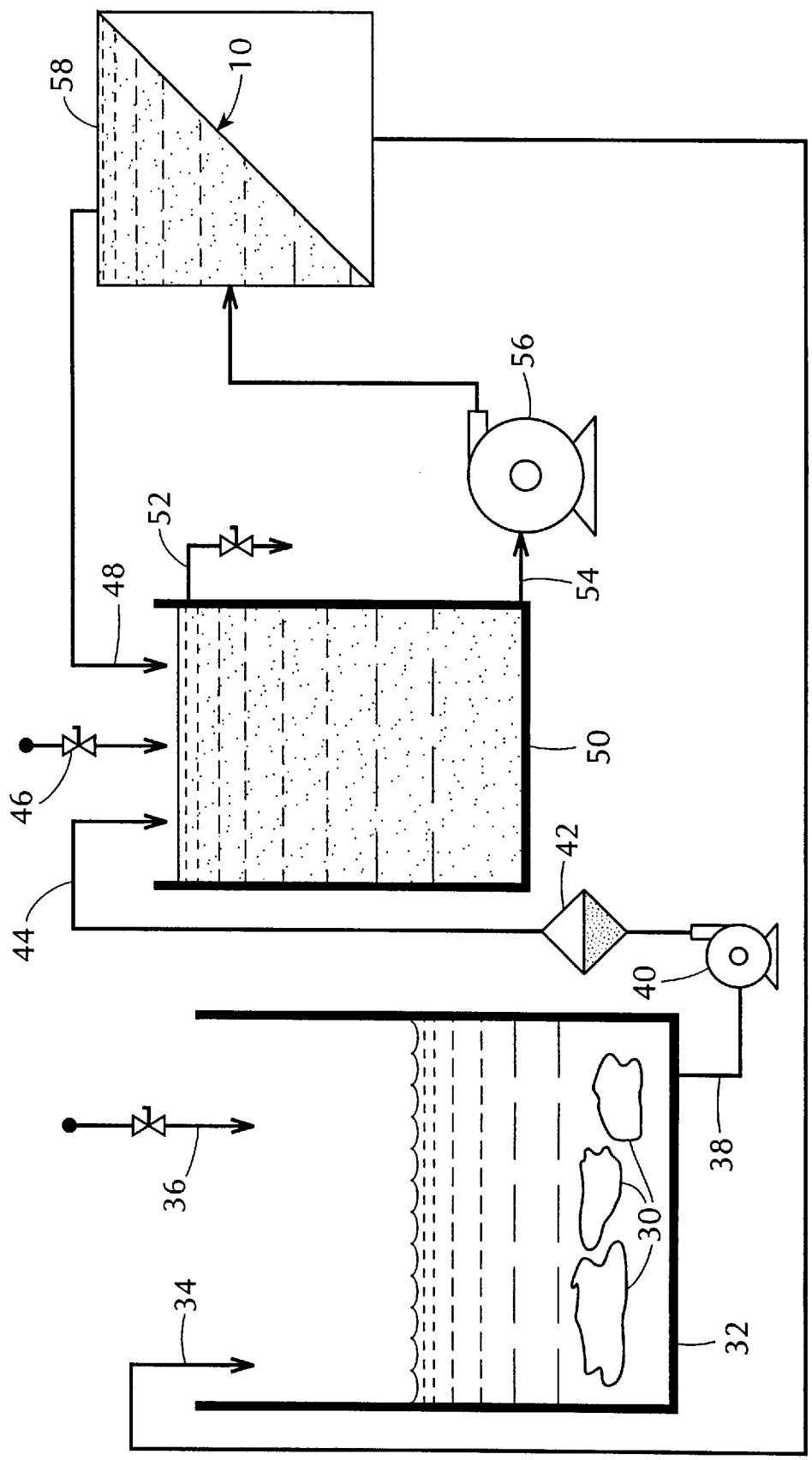
FIG. 2 shows the overall aqueous cleaning process with recycle of the cleaner.

In FIG. 2 soiled objects 30 to be cleaned are located in washing tank (washer) 32. The fluid present in washer 32 is a combination of recycled soil-depleted stream 34 from membrane separation 58, any make-up 36 of cleaning mixture necessary to replenish cleaner lost (e.g., cleaner lost along with soil purge stream 52), and soil carried into the washer by parts 30 to be cleaned. Washer effluent (spent cleaning mixture) 38 is moved by pump 40 through solids removal 42, Spent cleaning mixture 38 after any solid removal is denominated spent cleaning mixture stream 44.

Working tank 50 receives soil-contaminated stream 44, any cleaning mixture make-up 46 that is desired to be added to the working tank (cleaning mixture make-up can be added at almost place in the flowscheme), and recycled soil-enriched stream 48. The effect of recycling soil-enriched stream 48 is to cause the soil concentration in working tank 50 to increase. The steady state soil concentration depends on a number of factors, including the soil concentration in recycle stream 48 and the relative flow rates of working tank effluent stream 54 and recycle stream 48.

After the soil has been concentrated sufficiently in tank 50, to keep the system at steady state (if the process is not being run purely in a batch mode) stream 52 is purged to remove from the system an amount of soil equal to the net soil being added to the system by parts 30 being washed in tank 32.

Working tank effluent 54 is sent by pump 56 to membrane separation 58. Although spent cleaning mixture 38 has had some of the entrained solids (if present) removed in unit 42 and has been combined with recycle 48 and cleaning mixture make-up 46, stream 54 is still considered to be spent cleaning mixture. Thus, as used in the claims, the "spent cleaning mixture" resulting from cleaning the objects to be cleaned should be understood to indicate stream 38 as well as streams produced from it (for example, streams 44 and streams 54) prior to processing stream 38 into soil-enriched and soil-depleted streams.

Processing device 58 may comprise one or more unit operations of any type so long as it or they result in processing stream 54 into soil-enriched and soil-depleted streams. Device 58 will usually be one or more filtration devices. If processing device 58, which splits the spent cleaning mixture into soil-enriched and soil-depleted streams, is not the type of device that inherently can provide enough cleaning action on the feed side of the membrane (e.g., a rotary disc device using a hydrodynamic phenomenon such as Taylor vortices), pump 56 may need to circulate a substantially higher amount of fluid across the feed side of the membrane (cross-flow) to provide the required membrane cleaning action. In that case, one of the functions of working tank 50 is to provide hold-up and mixing volume for the large recycle stream 48, which may be significantly larger in flow rate than stream 44. On the other hand, if a separation device is used that does not require the high flow rate on the feed side to provide the desired cleaning, tank 50 may be eliminated. In that case the presumably smaller recycle stream 48 could be recycled to the feed side of pump 56, where stream 48 could be combined with stream 44. If a separation device is used that requires a large cross-flow rate, the working tank may still be eliminated by recirculating the soil-enriched phase back to the inlet (or suction) of pump 56 and withdrawing a continuous or semi-continuous bleed stream (or purge) from the recycled soil-enriched stream. Adjusting the ratio of the flowrate of the bleed stream to the flowrate of the soil-depleted stream allows the cleaner concentration of the spent cleaning mixture delivered to the membrane to be manipulated (adjusted).

It should be understood that FIG. 2 is schematic and does not Show the instrumentation, wiring, or heat exchange equipment that might be necessary to adjust the temperature of any of the streams. Because the cleaning mixture has a cloud point that occurs as the temperature rises, the system desirably is run so that soil-depleted stream 34 is contacted with the objects to be cleaned at a temperature above the cloud point temperature and stream 54 enters separation unit 58 at a temperature below the cloud point temperature so that the cleaner does not self-aggregate to any significant extent, If it does self-aggregate to any significant extent, rejection of cleaner by membrane 10 will increase, which is undesirable. In other words, if the cleaner does self-aggregate to any significant extent, relatively more of the cleaner will be unable to pass through membrane 10 (because the aggregates are too large for the membrane pores) and relatively more of the cleaner will be present in soil-enriched stream 48 being recycled to working tank 50 and relatively less of the cleaner will be present in soil-depleted stream 34 being recycled to washing tank 32. Therefore, cooling and heating may be required to adjust the temperature of the streams to the desired levels. Instead of adjusting the temperature, other parameters (e.g., the presence and/or concentration of various substances) may provide the means for causing a stream to be below its cloud point (in which case, there is no significant cloudiness) or at or above its cloud point (in which case, there is significant cloudiness).

Generally, the cleaning mixture will be used to clean the objects to be cleaned at a temperature not more than 10° F. above its cloud point temperature, desirably not more than 7° F. above its cloud point temperature, preferably not more than 5° F. above its cloud point temperature, and most preferably not more than 2° F. above its cloud point temperature. Thus, the cleaning mixture will be used to clean at a temperature of from its cloud point temperature to not more than 10° F. above its cloud point temperature, desirably of from its cloud point temperature to not more than 7° F. above its cloud point temperature, preferably of from its cloud point temperature to not more than 5° F. above its cloud point temperature, and most preferably of from its cloud point temperature to not more than 2° F. above its cloud point temperature.

Generally, the spent cleaning mixture will be processed to form the soil-enriched stream and the soil-depleted stream at a temperature below its cloud point temperature and at a temperature not more than 10° F. below its cloud point temperature, desirably not more than 7° F. below its cloud point temperature, preferably not more than 5° F. below its cloud point temperature, and most preferably not more than 2° F. below its cloud point temperature.

If the membrane and system were perfect, no soil would pass through membrane 10, no aggregates would form or be present in separator 58, and transmission of cleaning mixture through the membrane (for recycle to the washing tank in stream 34) would be 100%, that is, transmission coefficient γ would be unity.

Figure 3:
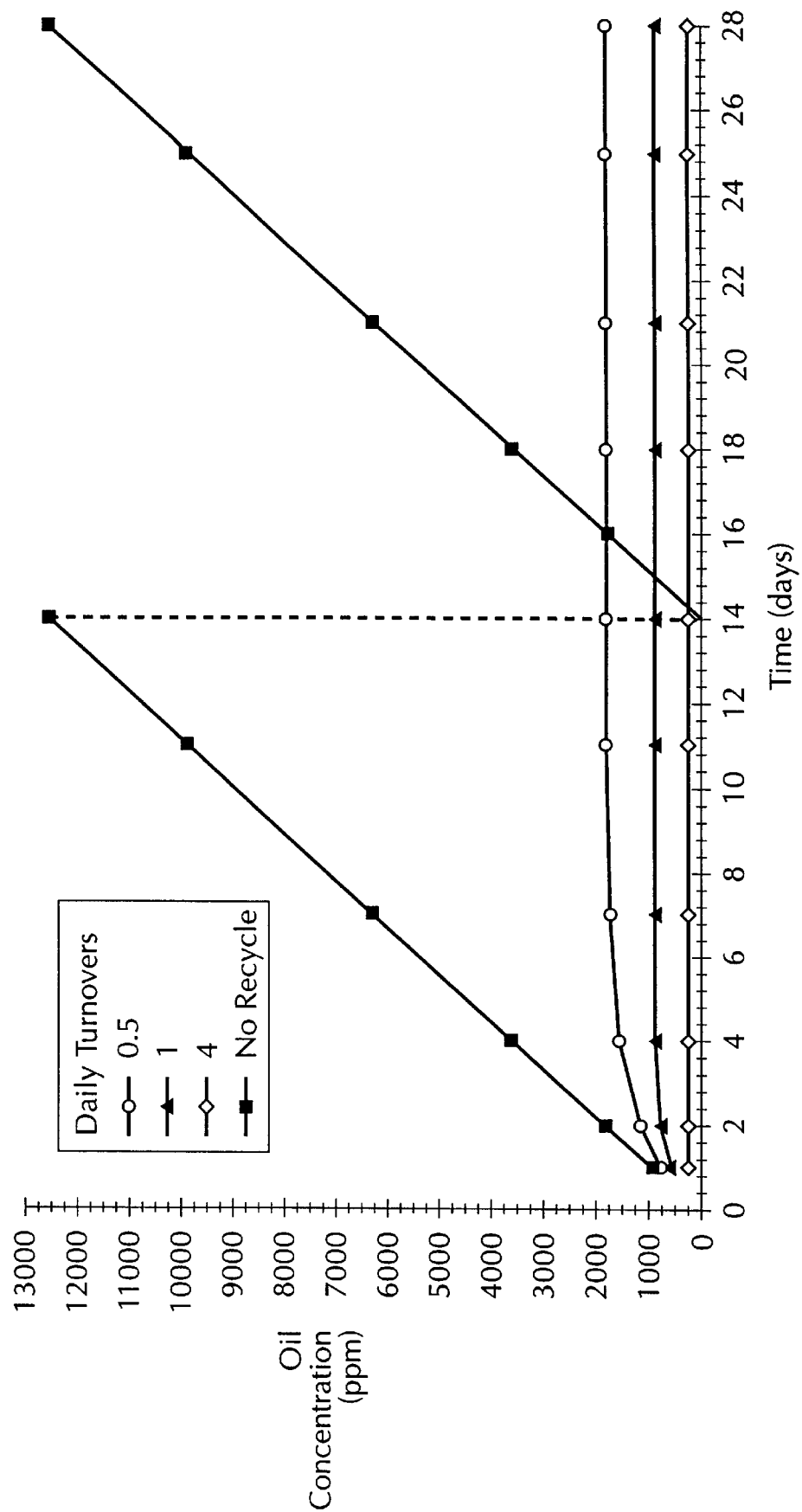
FIG. 3 is a plot of wash tank oil concentration against time for various rates of cleaner turnover.
Figure 4:
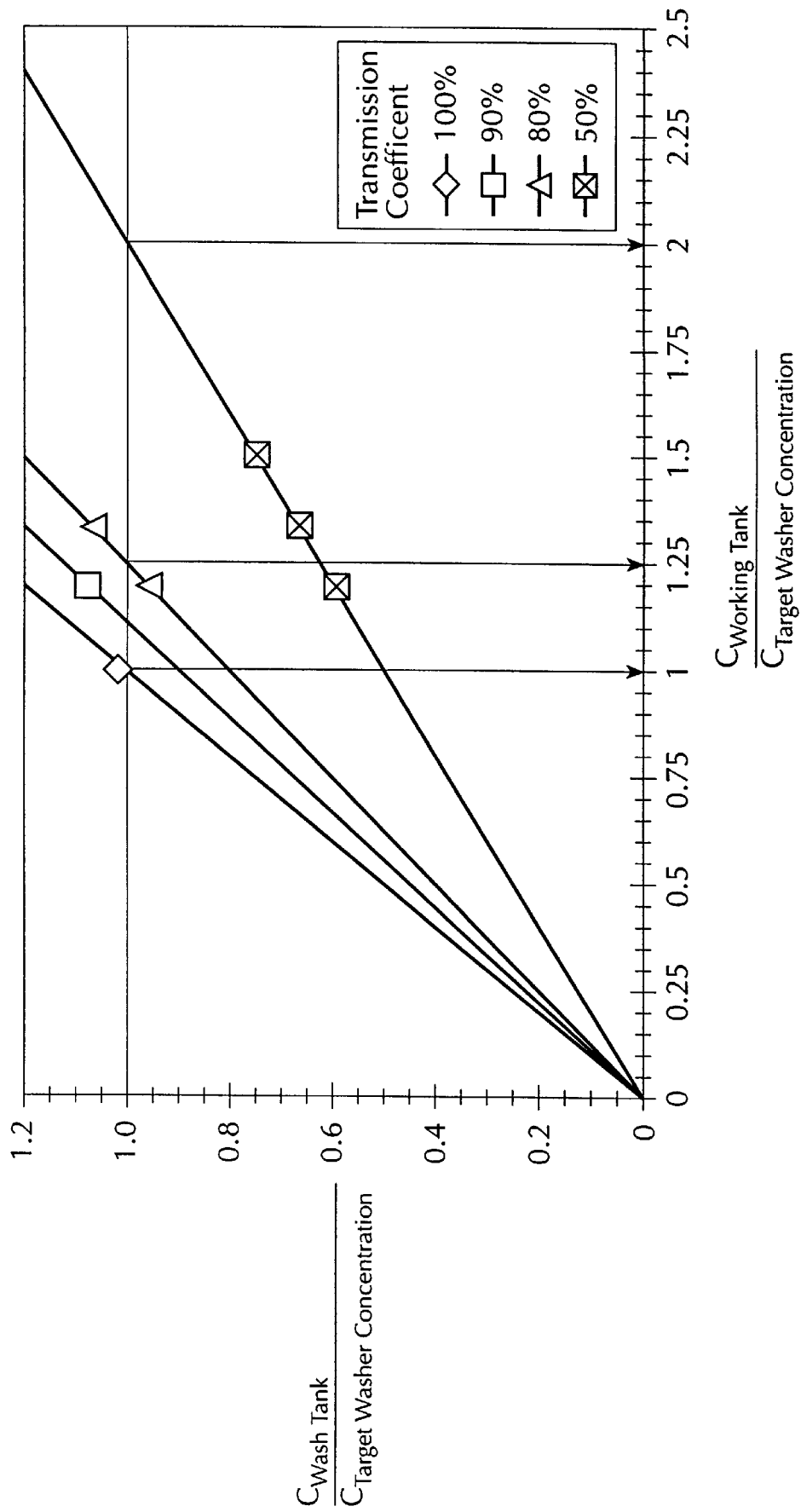
FIG. 4 is a plot relating steady state wash tank cleaner concentration to working tank cleaner concentration for different transmission coefficients.

As shown in the system in FIG. 2, the membrane continuously traps the soiled (e.g., oily) phases in the working tank while recycling regenerated cleaner (stream 34) back to the parts washer sump (washing tank 32). By performing a mass balance on the oil levels in the washing tank, time-dependent oil concentration profiles can be obtained. According to the analysis, as shown in FIG. 3, low steady state oil levels can be maintained by filtering as little as half the washer volume per day. This indicates that relatively small, economical filtration systems can be used for recycle and achieve a significant improvement in washer performance.

The implications of this analysis are significant. Use of recycle systems will significantly affect process cost and part quality. By regenerating the cleaning fluid, savings are realized through reductions in both the usage of virgin cleaner and the disposal rate of spent cleaner. To further reduce the disposal volume of oily waste, the contents in working tank 50 (FIG. 2) can be intermittently batch processed. System payback with these savings may be achieved in less than one year.

Because the recycle systems allow part washers to operate at low steady state oil levels (FIG. 3), parts can be consistently cleaned to a higher level. Consequently, secondary surface finishing operations (painting, electroplating, etc.) produce higher quality parts that have lower rework rates. These benefits can result in even greater cost savings than those realized only from minimizing cleaner usage and disposal rates.

To ensure cleaner integrity after regeneration by a given recycling method, the cleaner composition must be validated. Because cleaning mixture chemistries are so diverse, this analysis can be quite complicated. Detailed knowledge of the cleaning mixture's composition is necessary to make the validation process efficient. A number of tests are used routinely in the industry to verify cleaner activity. For an alkaline cleaning mixture, such tests include pH titration to measure free and total alkalinity, extraction and titration to measure surfactants, chemical oxygen demand (COD) analysis to measure the general organic surfactant concentration level, and HPLC and Fourier Transform Infrared Spectroscopy (FTIR) to qualitatively "fingerprint" the broad chemical composition of the cleaning mixture. Methods similar to those used for validating the integrity of alkaline cleaners are used to validate acid cleaners.

Whether or not a cleaner having a cloud point is used, manipulation of cleaner distribution within the recycle process can be used to speed the approach to steady state and can, even if the cleaner transmission characteristics are only fair, be used to improve washer performance. Following is a mass balance on a closed loop washer system (FIG. 2):

$$V_{Washer}\frac{dC_{Washer}}{dt} = Q_{Permeate}(C_{Washer} - C_{Permeate}), \quad \text{(Eqn. 2)}$$

where $C_{Permeate} = C_{Working\ Tank} \times \gamma$.

The time dependent solution to this equation is as follows:

$$\frac{C_{Washer}}{C_{Washer\ Target}} = \frac{\gamma\ C_{Washing\ Tank}(1 - e^{-\gamma N_T \tau})}{C_{Washer\ Target}} + \quad \text{(Eqn. 3)}$$

$$\frac{C_{Washer\ Initial}(e^{-\gamma N_T \tau})}{C_{Washer\ Target}}$$

where $N_T$ equals the number of turnovers (volume divided by flowrate) and t is time.

The steady state solution to this equation is as follows:

$$\frac{C_{Washer}}{C_{Washer\ Target}} = \frac{\gamma\ C_{Working\ Tank}}{C_{Washer\ Target}} \quad \text{(Eqn. 4)}$$

From these equations it can be shown that the rate of approach to steady state can be expedited by setting the working tank cleaner concentration equal to $C_{Washer\ Target}/\gamma$. It can also be shown that the target washer concentration can be achieved in the case of less than 100% cleaner transmission by increasing the working tank concentration to a value of $C_{Washer\ Target}/\gamma$. This approach to recycling compensates for poorly recyclable cleaners, that is, cleaners whose transmission coefficient γ is not as high as would otherwise be desired and which might not be used at all if it were not for the present invention. (It should be understood that "$C_{Working\ Tank}$" refers to the concentration of cleaner in the stream that is fed to separator 58 to be processed into the soil-enriched and soil-depleted streams, whether or not a working tank per se is used.)

Figure 5:
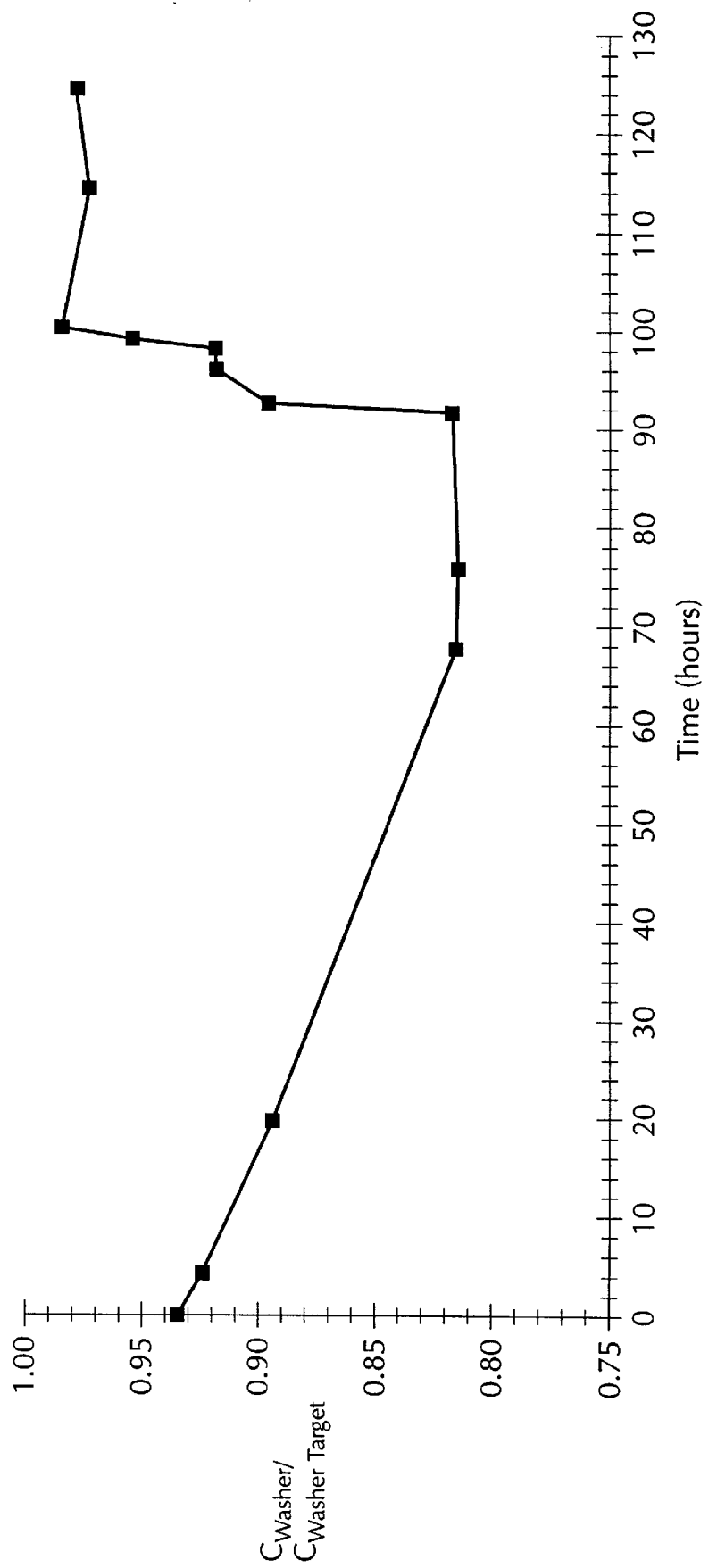
FIG. 5 is a plot of washer tank cleaner concentration as a function of time for an experiment in which the cleaner concentration in the working tank is spiked.
Figure 6:
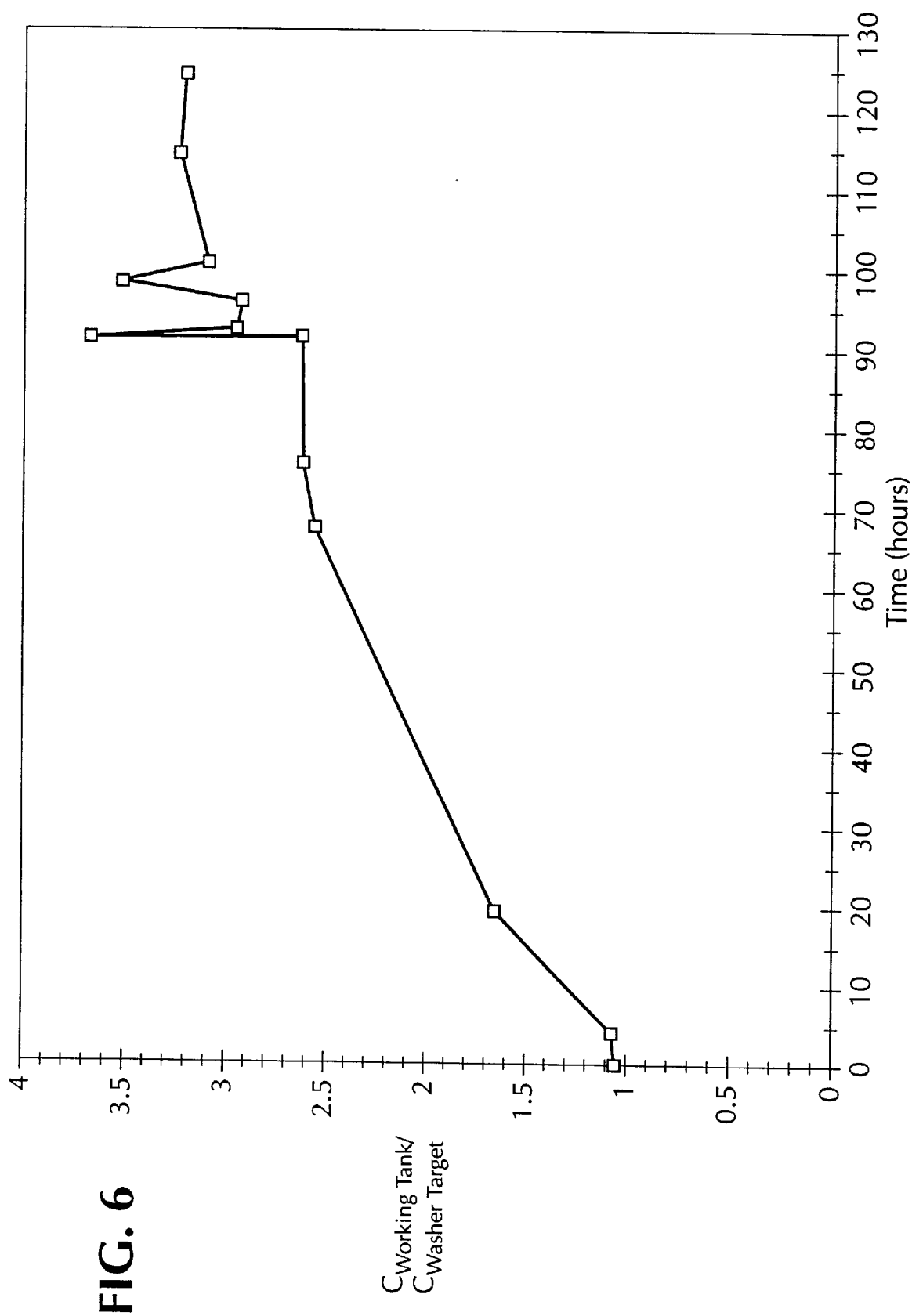
FIG. 6 is a plot of working tank cleaner concentration as a function of time for the same experiment in which the cleaner concentration in the working tank is spiked.

FIGS. 5 and 6 illustrate results from experiments where transmission coefficient γ was only approximately ⅓. This test was performed at 40° C. with the a 500,000-dalton molecular weight cutoff ultrafiltration membrane. (As used herein, the term "ultrafiltration" refers to a filtration process using a filter whose largest pore size is about 0.1 microns (an "ultrafilter") and the term "microfiltration" refers to a filtration process using a filter whose largest pore size is about 1 micron (a "microfilter").) As can be seen from FIG. 6, the cleaner concentration in the working tank was spiked twice (at about 92 hours and again at about 98 hours). Following each addition of cleaner, the cleaner level in the washing tank increased (FIG. 5). When the cleaner level in the working tank was increased to 3 times the target level of cleaner in the wash tank (at about 100 hours in FIG. 6), the wash tank cleaner concentration rapidly approached the target level (i.e., the y-axis value in FIG. 5 jumped from about 0.82 to about 1).

It has also been found that recycle of cleaners can be enhanced by use of a membrane having the appropriate surface chemistry and chemical composition. For example, Membrex, Inc. systems (using Membrex, Inc.'s patented (U.S. Pat. No. 4,906,379) UltraFilic® ultrafiltration membrane) can be used for recycling rinse waters and for recycling and recovery of semi-aqueous cleaners such as Dupont's Axarel-32®.

Membrex, Inc.'s UltraFilic® membrane is made of modified polyacrylonitrile (PAN) and it has physicochemical properties that allow it to be used in the normally harsh process environment of parts washing facilities. Desirable membrane properties include: (1) surface chemistry that helps the membrane resist fouling (plugging) from both free-floating and emulsified oils; (2) a chemically cross-linked matrix to enhance physical and chemical stability toward pH and aggressive solvents; and (3) pore size and morphology designed to ensure complete passage of all cleaner components while retaining greater than 99.9% of the oils.

The surface of Membrex, Inc.'s UltraFilic® PAN membrane was chemically modified (see U.S. Pat. No. 4,906, 379) to be extremely hydrophilic ("hyperhydrophilic"). In practice, this hyperhydrophilic surface resists fouling by oils, emulsions, and other hydrophobic solutes. Consequently, efficient rates of filtration can be achieved for extended periods of time. The ability of this membrane to efficiently process waste streams containing free-floating as well as emulsified oils is a key performance advantage over other ultrafiltration membranes. Conventional membranes made of more hydrophobic materials such as polyvinylidene difluoride (PVDF), polysulfone (PS), or unmodified polyacrylonitrile (PAN) foul readily in the presence of even low concentrations of free oils.

The difference in surface hydrophilicity of these membranes can be shown quantitatively by examining the contact angles formed by a water droplet on each membrane's surface (contact angle theta for water droplet 60, as shown in FIG. 7). Smaller contact angles indicate greater driving forces for water to adsorb to the membrane and for oil to be rejected. Membrex's UltraFilic® modified PAN membrane has a contact angle that is many times lower than that for unmodified PAN, PS, or PVDF membranes.

Membrex, Inc.'s UltraFilic® membrane matrix is chemically cross-linked to preserve its performance properties (e.g., porosity and pore size distribution) over a broad range of pH (pH 1 to pH 13). The membrane is even resistant to a wide range of aggressive solvents (e.g., chlorinated hydrocarbons, ketones, amides), including those that normally dissolve PAN.

Membrane pore size and morphology are important elements in choosing ultrafiltration membranes for aqueous cleaner recycling. The pore size of a membrane must be selected such that all active components in the cleaning mixture flow through the membrane while the oils are filtered out (i.e., are rejected). Additionally, the membrane morphology must be designed to inhibit the physical plugging of the filter by suspended colloidal materials. The morphology of the UltraFilic® filters is such that the separation of the micelles occurs at the surface of the filter, thus eliminating the internal pore plugging fouling mechanism common to microfilters.

The most important factor in selecting a cleaning mixture is whether it can provide the required cleaning under the proposed conditions of use to clean the soil from the objects in question. Whether a cleaning mixture is recyclable is desirably determined by testing virgin cleaning mixture. Major factors in the determination are (1) whether the cleaning mixture turns cloudy or forms large micelles (i.e., does the cleaner—or do the cleaners—self-aggregate and form particles large enough to scatter light) at its—or their—proposed use concentration and (2) whether the cleaning mixture is above its cloud point temperature at its proposed use temperature. The cleaning mixture should be filtered at least 10 times above and below the cloud point temperature, alkalinity (for an alkaline cleaning mixture) should be quantified (free and total alkalinity analysis), and cleaner transmission should be determined (determining $\gamma$) using, e.g., chemical oxygen demand analysis. If $\gamma$ is greater than 0.75 (75%), the cleaner should be considered recyclable, assuming the other criteria are met.

The tests run on the virgin cleaning mixture include surfactant titration (total amount of surfactant is determined by an extraction/titration method; in general, each surfactant requires a special method); free alkalinity (to measure free, unreacted alkalinity builder in the cleaning mixture); total alkalinity (to measure free alkalinity plus the alkalinity consumed in the cleaning process); conductivity (to measure the total ionic content); refractometry (to indirectly measure the concentration of dissolved components that influence the refractive index); FTIR (to measure the presence of all surfactants using infrared spectroscopy); HPLC (to separate all the surfactants using various chromatographic techniques); Total Organic Carbon (to measure total organic content, including surfactant and oil in contaminated samples); and Chemical Oxygen Demand (to measure organic content and content of certain metals, including surfactant and oil in contaminated samples).

Variations and modifications will be apparent to those skilled in the art and the following claims are intended to cover all variations and modifications falling within the true spirit and scope of the invention. For example, if different components of the cleaning mixture have different transmission coefficients $\gamma$ through the membrane or membranes that are used for processing spent cleaning mixture into soil-enriched and soil-depleted streams, the one or more components may be selectively concentrated in one or the other of those two streams. That may be advantageous in some systems, where different components of the cleaning mixture are desirably used at different concentrations in different washing tanks and/or at different temperatures.

We claim:

1. A process for cleaning an object that is contaminated with soil utilizing a cleaning mixture containing a cleaner at a desired concentration, the cleaning mixture having a cloud point that occurs as the temperature rises, the process comprising the steps:

(a) contacting the object to be cleaned with the cleaning mixture at a temperature at or above the cloud point temperature to remove soil from the object and suspend at least some of the removed soil in the cleaning mixture, thereby forming spent cleaning mixture, the spent cleaning mixture having a temperature, a composition, and a concentration of cleaner;

(b) adjusting the temperature of spent cleaning mixture or adjusting the composition of spent cleaning mixture or both so that the temperature of the resulting spent cleaning mixture is below its cloud point temperature; and (c) processing the resulting spent cleaning mixture while its temperature is below its cloud point temperature to form a soil-depleted stream and a soil-enriched stream.

2. The process of claim 1 further comprising mixing soil-enriched stream with spent cleaning mixture prior to step (c).

3. The process of claim 1 further comprising recycling at least part of the soil-depleted stream from step (c) to the contacting step.

4. The process of claim 3 further comprising mixing soil-enriched stream with spent cleaning mixture prior to step (c).

5. The process of claim 1 where step (c) comprises filtering spent cleaning mixture while its temperature is below its cloud point temperature to form the soil-depleted stream and the soil-enriched stream.

6. The process of claim 5 wherein the filtering in carried out in a tangential flow filter or a high shear filter.

7. The process of claim 6 wherein the high shear filter contains a rotating or oscillating member.

8. The process of claim 5 where in the filtering employs a microfilter or an ultrafilter.

9. The process of claim 5 wherein the filtering employs a hydrophilic filter.

10. The process of claim 1 wherein the process is carried out in a system comprising means for carrying out the contacting of step (a), means for carrying out the adjusting of step (b), and means for carrying out the processing of step (c); and wherein the process further comprises adjusting the system so that at steady state $$\frac{C_{Washer}}{C_{Washer\ Target}} \text{ approaches } 1,$$

wherein $C_{Washer}$ is the concentration of cleaner in the spent cleaning mixture and $C_{Washer\ Target}$ is the desired concentration of cleaner in the cleaning mixture prior to contacting the object to be cleaned, wherein adjusting the system comprises adjusting $C_{Working\ Tank}$ to be approximately equal to $C_{Washer\ Target}$ divided by transmission coefficient $\gamma$, wherein $C_{Working\ Tank}$ is the concentration of cleaner in the spent cleaning mixture processed to form the soil-depleted and soil-enriched streams and transmission coefficient $\gamma$ is the ratio of (i) concentration of cleaner in the soil-depleted stream to (ii) $C_{Working\ Tank}$.

11. The process of claim 1 wherein contacting step (a) is carried out at a temperature not more than 10° F. above the cloud point temperature of the cleaning mixture.

12. The process of claim 1 wherein processing step (c) is carried out at a temperature not more than 10° F. below the cloud point temperature of the resulting spent cleaning mixture.

13. The process of claim 1 wherein contacting step (a) is carried out at a temperature not more than 5° F. above the cloud point temperature of the cleaning mixture.

14. The process of claim 1 wherein processing step (c) is carried out at a temperature not more than 5° F. below the cloud point temperature of the resulting spent cleaning mixture.

15. The process of claim 1 wherein contacting step (a) is carried out at a temperature not more than 5° F. above the cloud point temperature of the cleaning mixture and processing step (c) is carried out at a temperature not more than 5° F. below the cloud point temperature of the resulting spent cleaning mixture.

16. A process for cleaning an object that is contaminated with soil utilizing an aqueous cleaning mixture containing a cleaner at a desired concentration, the cleaning mixture having a cloud point that occurs as the temperature rises, the process comprising the steps:

(a) contacting the object to be cleaned with the aqueous cleaning mixture at a temperature at or above the cloud point temperature to remove soil from the object and suspend at least some of the removed soil in the cleaning mixture, thereby forming spent cleaning mixture, the spent cleaning mixture having a temperature and a concentration of cleaner;

(b) adjusting the temperature of spent cleaning mixture so that the temperature of the resulting spent cleaning mixture is below its cloud point temperature; and (c) processing the resulting spent cleaning mixture while its temperature is below its cloud point temperature to form a soil-depleted stream and a soil-enriched stream.

17. The process of claim 16 further comprising mixing soil-enriched stream with spent cleaning mixture prior to step (c).

18. The process of claim 16 further comprising recycling at least part of the soil-depleted stream from step (c) to the contacting step.

19. The process of claim 18 further comprising mixing soil-enriched stream with spent cleaning mixture prior to step (c).

20. The process of claim 16 where step (c) comprises filtering spent cleaning mixture while its temperature is below its cloud point temperature to form the soil-depleted stream and the soil-enriched stream.

21. The process of claim 20 wherein the filtering is carried out in a tangential flow filter or a high shear filter.

22. The process of claim 21 wherein the high shear filter contains a rotating or oscillating member.

23. The process of claim 20 where in the filtering employs a microfilter or an ultrafilter.

24. The process of claim 20 wherein the filtering employs a hydrophilic filter.

25. The process of claim 16 wherein the process is carried out in a system comprising means for carrying out the contacting of step (a), means for carrying out the adjusting of step (b), and means for carrying out the processing of step (c); and wherein the process further comprises adjusting the system so that at steady state $$\frac{C_{Washer}}{C_{Washer\ Target}} \text{ approaches } 1,$$

wherein $C_{Washer}$ is the concentration of cleaner in the spent cleaning mixture and $C_{Washer\ Target}$ is the desired concentration of cleaner in the cleaning mixture prior to contacting the object to be cleaned, wherein adjusting the system comprises adjusting $C_{Working\ Tank}$ to be approximately equal to $C_{Washer\ Target}$ divided by transmission coefficient $\gamma$, wherein $C_{Working\ Tank}$ is the concentration of cleaner in the spent cleaning mixture processed to form the soil-depleted and soil-enriched streams and transmission coefficient γ is the ratio of (i) concentration of cleaner in the soil-depleted stream to (ii) $C_{Working\ Tank}$.

26. The process of claim 16 wherein contacting step (a) is carried out at a temperature not more than 10° F. above the cloud point temperature of the cleaning mixture.

27. The process of claim 16 wherein processing step (c) is carried out at a temperature not more than 10° F. below the cloud point temperature of the resulting spent cleaning mixture.

28. The process of claim 16 wherein contacting step (a) is carried out at a temperature not more than 5° F. above the cloud point temperature of the cleaning mixture.

29. The process of claim 16 wherein processing step (c) is carried out at a temperature not more than 5° F. below the cloud point temperature of the resulting spent cleaning mixture.

30. The process of claim 16 wherein contacting step (a) is carried out at a temperature not more than 5° F. above the cloud point temperature of the cleaning mixture and processing step (c) is carried out at a temperature not more than 5° F. below the cloud point temperature of the resulting spent cleaning mixture.

* * * * *